Oct. 25, 1955  E. C. CHAPMAN  2,721,379

METHOD OF WELDING A TUBE TO A WALL MEMBER

Filed March 30, 1953

INVENTOR
Edward C. Chapman
BY
ATTORNEY

United States Patent Office 2,721,379
Patented Oct. 25, 1955

2,721,379
METHOD OF WELDING A TUBE TO A WALL MEMBER

Edward Corbin Chapman, Chattanooga, Tenn., assignor to Combustion Engineering, Inc., New York, N. Y., a corporation of Delaware Application March 30, 1953, Serial No. 345,407

3 Claims. (Cl. 29—479)

This invention relates to a method of welding a metallic tube to a metallic wall in a fluid tight manner and is particularly well adapted for the welding of tubes to a boiler header.

In carrying out this invention the wall is bored to receive an end of the tube with one end of the bore being counterbored a predetermined distance. The tube is then inserted into the bore with its end face lying adjacent the base of the counterbore and is expanded so as to retain it in position within the bore during the welding operation. A sleeve having a chamfered periphery on one end is then inserted into the end of the tube with its chamfered peripheral portion lying opposite the counterbore and adjacent the end face of the tube thereby forming a dish-shaped annular relieved portion or well at the end face of the tube with this end face lying at the bottom of this relieved portion or well. Weld metal is then flowed into this relieved portion or well preferably at least to a depth equal to the wall thickness of the tube. The sleeve is then machined from the end of the tube leaving a weld which is highly satisfactory in all respects.

Prior to the method of the present invention it was extremely difficult if not impossible to satisfactorily weld tubes, such as superheater tubes, to boiler headers of relatively small transverse section because of the difficulty of manipulating the welding equipment within the very limited area in these headers. With this invention, however, not only is it possible to obtain a highly satisfactory weld in such instances but the difficulty of the welding operation itself is greatly reduced.

It is an object of this invention to provide a method of welding a metallic tube to a metallic wall which is particularly well adapted for the welding of tubes to boiler headers and which produces a highly satisfactory weld while requiring a minimum of skill.

The invention will be understood from the following description when considered in conjunction with the accompanying drawing forming a part thereof and in which.

Figure 1:
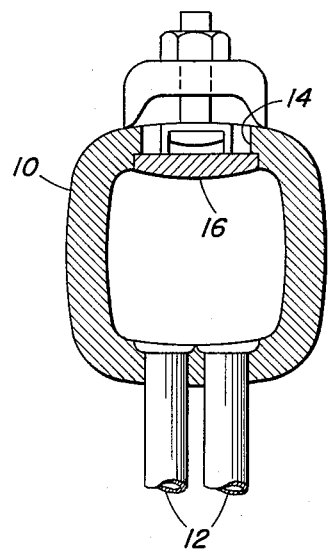
Figure 1 is a transverse sectional view of a boiler header showing the connection of tubes thereto.
Figure 2:
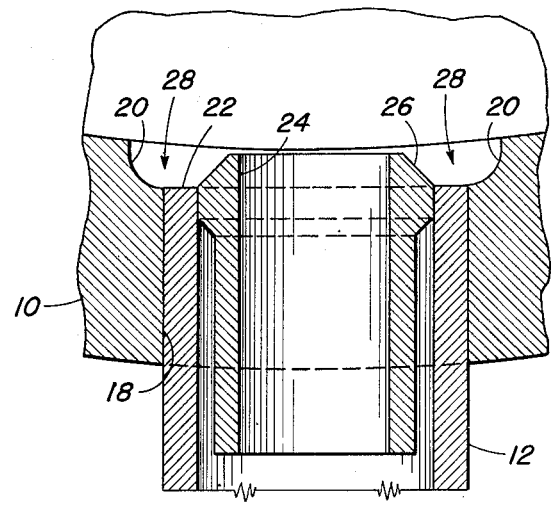
Figure 2 is an enlarged sectional view of one of the tube connections with the header and showing the sleeve, which is employed in making the tube connections, inserted within the end of the tube.
Figure 3:
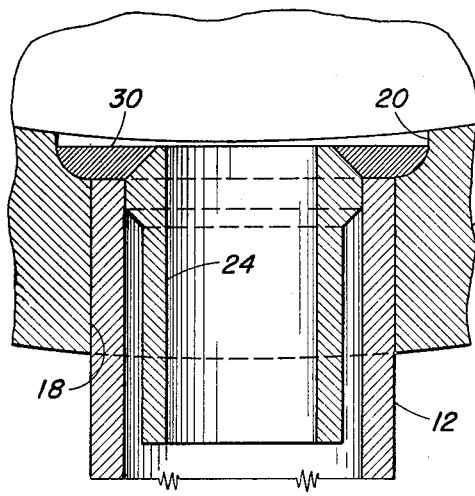
Figure 3 is a view similar to that of Fig. 2 but after the welding operation has been performed.
Figure 4:
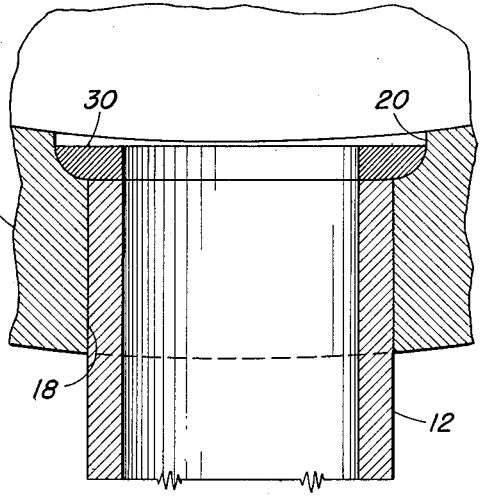
Figure 4 is a view similar to that of Fig. 3 but after the sleeve has been removed.

Referring now to the drawing, numeral 10 which designates a boiler header to which are connected tubes 12 and which is provided with handhole 14 at a location generally opposite the tube connections with the handhole being normally closed by closure member 16.

In connecting the ends of each of the tubes 12 to the wall of the header, the wall is first provided with a bore 18 the inner end of which is counterbored as at 20. The end of tube 12 is then inserted within bore 18 so that its end face 22 is adjacent the base of counterbore 20 and is expanded within bore 18 so as to retain the tube in place during the welding operation.

After the expanding operation, sleeve or collar 24 is inserted into the end of tube 12. The end of the sleeve projects from the end of the tube a distance substantially equal to the depth of counterbore 20 and is provided with a chamfer or relieved portion 26 which together with end face 22 of tube 12 and counterbore 20 forms a well or relieved portion 28 the depth of which is preferably at least equal to the wall thickness of tube 12.

Weld metal, identified as 30, is then deposited or flowed into relieved portion 28 to a depth at least equal to the wall thickness of tube 12 after which sleeve 24 is drilled or otherwise removed from the end of tube 12 leaving a strength weld which provides a fluid tight joint between the tube and the wall of header 10.

In welding tubes to headers of relatively small section, electric-arc welding apparatus is employed. In carrying out the welding operation by means of this apparatus and with the method of the present invention a pool of weld metal will form and remain in the relieved portion 28 greatly lessening the difficulty of applying the weld and decreasing the skill required to obtain a satisfactory weld which will be of the strength required and also will be fluid tight.

If desired, after sleeve 24 has been removed tube 12 may be re-expanded outwardly against the wall of bore 18 to firmly seat the tube against this wall.

In certain instances where it is desirable to have a restrictor at the inlet of the tube, sleeve 24 may be left in the tube although it has generally been preferable to remove this sleeve and provide a removable restrictor in instances where a restrictor is required.

With the method of this invention it is possible to weld tubes to boiler headers of relatively small transverse section in an entirely satisfactory manner, requiring a minimum of skill and producing a strength weld which is satisfactory in all respects.

Inasmuch as changes may be made in the method herein disclosed and/or in the order of performance of the several steps thereof without departing from the principles of the invention, it is to be understood that the invention is not to be limited except by the scope of the appended claims.

I claim:

1. The method of strength welding and sealing a tube to a wall or the like which is provided with a bore comprising the steps of counterboring one end of said bore to a depth at least substantially equal to the wall thickness of the tube, positioning the tube in the bore so the end face of the tube is substantially flush with the base of the counterbore and the tube extends out through the end of the bore opposite the counterbored end, positioning a sleeve within the end of the tube so that an axial portion thereof extends outwardly of said end and cooperates with the end face of the tube and the counterbore to provide a radially extending dished annular relieved portion at the bottom of which is disposed the end face of the tube, and thereafter flowing weld metal into said annular relieved portion to a depth at least substantially equal to the wall thickness of the tube.

2. The method of claim 1 including removing the sleeve after the weld metal has solidified.

3. The method of claim 1 wherein the peripheral portion of the sleeve that extends outwardly from the end of the tube is chamfered.

References Cited in the file of this patent

UNITED STATES PATENTS

| | | |
|---|---|---|
| 920,743 | Hines | May 4, 1909 |
| 1,679,702 | Wysong | Aug. 7, 1928 |
| 1,792,928 | Reigart | Feb. 17, 1931 |
| 2,226,496 | Jacocks | Dec. 24, 1940 |
| 2,623,148 | Ronay | Dec. 23, 1952 |

FOREIGN PATENTS

| | | |
|---|---|---|
| 671,584 | Germany | Feb. 9, 1939 |